United States Patent [19]

Rozett

[11] 3,955,407

[45] May 11, 1976

[54] METHOD AND APPARATUS FOR TESTING KNITTING MACHINES

[75] Inventor: Lawrence Rozett, Flushing, N.Y.

[73] Assignee: The Singer Company, New York, N.Y.

[22] Filed: Apr. 29, 1975

[21] Appl. No.: 572,782

[52] U.S. Cl. .............. 73/88.5 R; 73/160; 66/1 R

[51] Int. Cl.² .............. G01B 7/18

[58] Field of Search .............. 73/88.5 R, 104, 160; 66/1 R, 157, 165

[56] References Cited

UNITED STATES PATENTS

| | | | |
|---|---|---|---|
| 2,611,811 | 9/1952 | Yates | 73/88.5 R |
| 2,620,386 | 12/1952 | Alspaugh et al. | 73/71.4 X |
| 3,555,894 | 1/1971 | Bratkowski | 73/88.5 R |
| 3,719,061 | 3/1973 | Hadam et al. | 66/157 |
| 3,757,536 | 9/1973 | Claiborne | 73/160 X |

*Primary Examiner*—Charles A. Ruehl
*Attorney, Agent, or Firm*—Robert E. Smith; W. V. Ebs; E. L. Bell

[57] ABSTRACT

A knitting machine section block is fitted with one or more strain gauge means, preferably on a backup plate for a needle influencing cam, so that during operation of the machine and without any adverse influence upon the output of the knitting machine, signals may be generated in response to the forces transmitted by the interaction of the knitting needles with the needle influencing cam. By analyzing the signals generated by the strain gauge means, as for instance, by the use of an oscilloscope, patterns representing the actual conditions may be compared with those of usual operation to identify specific part defects or specific abnormal conditions of operation.

2 Claims, 8 Drawing Figures

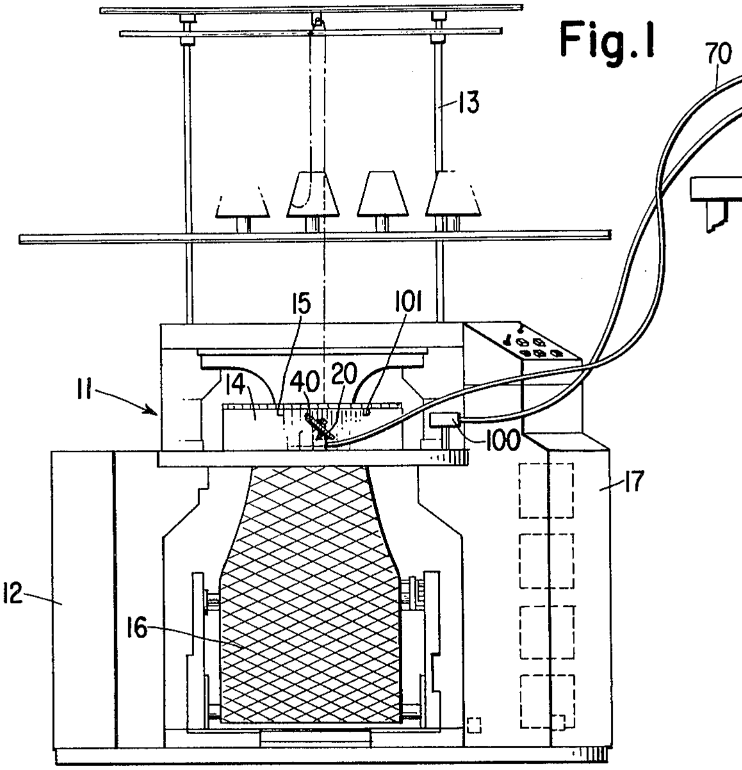
Fig.1
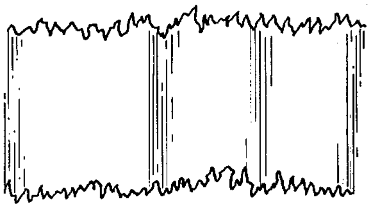
Fig.5
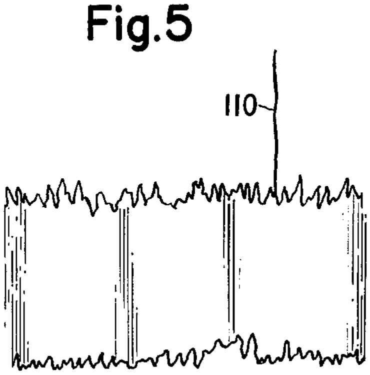
Fig.6
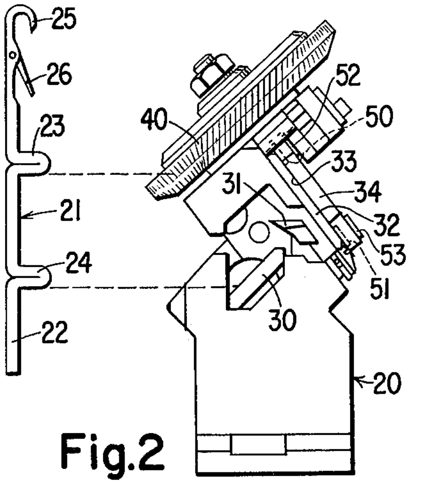
Fig.2
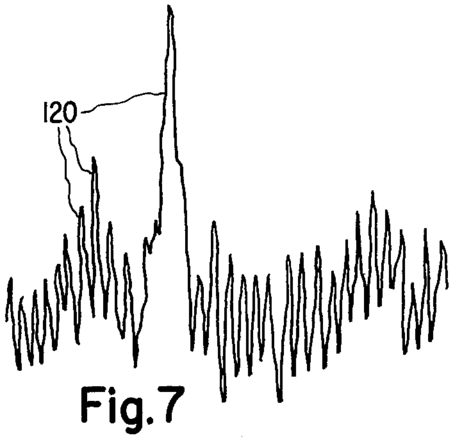
Fig.7
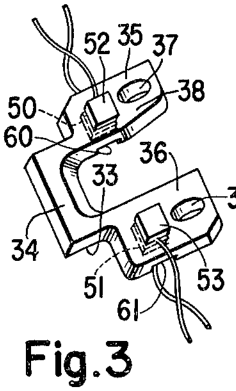
Fig.3
Fig.4
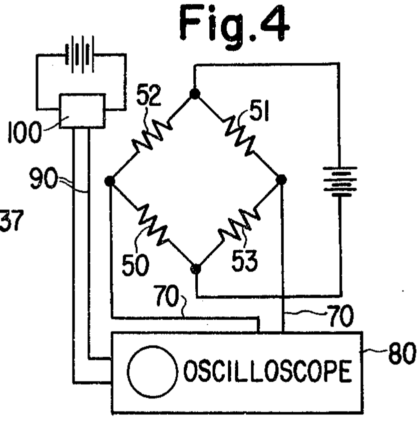
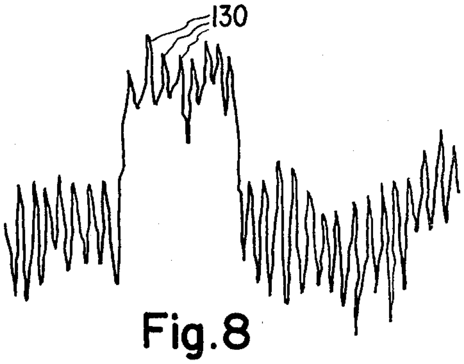
Fig.8

METHOD AND APPARATUS FOR TESTING KNITTING MACHINES

BACKGROUND OF THE INVENTION

In the art of machine knitting, it is common practice to employ many thousands of like elements in one given machine such as needle bed slots, jacks, needles and the like. A defect or abnormality in any of these elements can result in damage to the fabric being produced or have an adverse effect on the productivity of the machine. Heretofore, detection devices have been employed for specific abnormalities such as broken needle latch detectors or the like, and devices were known for detecting yarn or fabric discontinuity. Aside from being limited as to the specific defects to which they could respond, the prior art detection devices in many cases responded only after a defect had arisen in the fabric.

SUMMARY OF THE INVENTION

It is an object of this invention to provide an apparatus for generating signals responsive to the forces transmitted by the interaction of the needle reciprocating elements on the knitting machine without adversely effecting the machine operation. It is also an object of this invention to provide a method for generating and analyzing signals responsive to the forces transmitted by the interaction of the needle reciprocating elements such that not only may defective or broken machine elements be detected but in many instances abnormal conditions indicative of an impending defect may be recognized.

These objects are attained by providing strain measuring means on the supporting structure of a needle reciprocating cam means on a knitting machine section block. In this way signals may be generated responsive to the forces transmitted incident to needle reciprocation without detracting from the output of the knitting machine.

The method provided by this invention for testing the knitting machine comprises the comparison of the pattern of signals generated by the strain measuring means with reference to patterns of such signals delivered under known conditions of normal operation.

DESCRIPTION OF THE DRAWINGS

The accompanying drawings illustrate a preferred embodiment of this invention in which:

FIG. 1 represents a knitting machine to which this invention is applied,

FIG. 2 is an enlarged elevational view of the inside face of a section block for the knitting machine of FIG. 1, together with a knitting needle of the type adapted to be acted upon by the section block, FIG. 3 is an enlarged elevational view of a stitch cam backup plate of the section block of FIG. 2, FIG. 4 is an electrical wiring diagram illustrating one possible arrangement for providing signals from a plurality of strain gauges on one section block to an oscilloscope, FIG. 5 represents an oscilloscope trace of a signal from a strain gauge measuring device applied to the stitch cam backup plate of a knitting machine section block as shown in FIGS. 1, 2, and 3 during normal operation of the knitting machine, FIG. 6 represents an oscilliocope trace showing an abnormal condition in which one needle slot is damaged, FIG. 7 represents an oscilloscope trace showing an abnormal condition in which one needle latch is broken, and FIG. 8 represents an oscilloscope trace showing an abnormal condition in which a needle bed slot is malformed.

Referring to the drawings, FIG. 1 illustrates a conventional circular knitting machine indicated generally at 11 and including a frame 12 above which a yarn stand 13 is supported. Mounted to turn about a vertical axis in the frame is a needle bed 14 which may take the form of a hollow cylinder formed externally with vertical needle accommodating slots 15. Below the needle bed a fabric take-up mechanism 16 is arranged which is rotatable in unison with the bed by a drive unit 17.

FIG. 2 illustrates the inside face, i.e. that face which is contiguous to the needle bed 14 of one section block 20 together with an elevational view of one knitting needle 21 shown in that position in which the needle approaches the section block for cooperation therewith. It will be understood that a plurality of section blocks 20 are arranged on the frame 12 about the needle cylinder each section block carrying means for independently reciprocating the needles to complete a knitting operation incorporating into the fabric a spiral row of knit stitches formed of yarn from the yarn stand 13.

Referring to FIG. 2, each knitting needle is formed with a shank 22 constrained in a vertical needle bed slot, an upper butt 23 and a lower butt 24 projecting outwardly beyond the needle bed, and a yarn engaging hook 25 formed at the upper extremity and adapted to cooperate with a latch 26 pivoted to the shank beneath the hook.

The section block 20 as shown in FIG. 2, carries instrumentalities for engaging and influencing the lower needle butt 24 which may include but are not limited to a raise cam 30, a guard cam 31 and a stitch cam 32. The stitch cam 32 abuts and is movable along one surface 33 of a cam back-up plate 34 as illustrated in FIG. 3, and preferably formed with spaced limbs 35 and 36 each provided with an aperture 37 for accommodating a fastening (not shown) for securing the back up plate to the section block.

The upper needle butt 23 is adapted to cooperate with a pattern wheel 40 on the section block and by which certain needles may be selected and imparted special reciprocating movement so that patterned fabrics may be knitted. The stitch cam 32 is of sufficient extent as to engage and draw down the lowr butts 24 of all of the needles whether or not they are selected by the pattern wheel.

As shown in FIGS. 2 and 3, four strain gauges 50, 51, 52 and 53 are applied to the back-up plate 34. Preferably these strain gauges are each of the Piezo-resistive type such as that manufactured by Kulite Semi Conductor Co. 1030 Hoyt Avenue, Richfield, New Jersey and identified as Serial No.UGP 100-060. Other known types of strain gauges may also be used for instance, electro-resistance wire or foil types, inductance or capacitive types, or Piezo electric transducer types.

Preferably, two of the strain gauges 50 and 51 are cemented as by an epoxy cement each in a shallow recess 60 and 61 respectively cut in the surface 33 of the back-up plate which is contiguous to the stitch cam 32. Two of the strain gauges 52 and 53 are cemented on the opposite surface 38 of the back-up plate 35.

As the knitting machine is operated, the lower butt 24 of each successive needle during its period of influence by the stitch cam 32, will transfer forces to the stitch cam and thus to the back-up plate 34 which supports the cam against the thrust applied by the needle butts. The stresses developed on the back-up plate as a result of such transfer of forces, will be measured by the strain gauges 50, 51, 52 and 53.

The bridge circuit which is illustrated in FIG. 4 for the strain gauges 50, 51, 52 and 53 is advantageous in balancing the effect of temperature distribution, increasing the sensitivity, and minimizing localization of stress concentration. In the present invention, the signal derived from the composite effect of the strain gauge is applied by lines 70 across a set of deflection plates of a conventional oscilloscope 80 such as that manufactured by Telotronix Co. of Beaverton, Oregon and identified as model 564.

Synchronization signals are applied as by lines 90 to the oscilloscope 80 for regulating the sweep of an opposite set of deflection plates therein. The synchronization signals may be derived from a conventional light sensitive photocell unit 100 responding to light reflected from a timing mark 101 on the needle bed 14.

With the knitting machine as illustrated in FIG. 1 operating, the oscilloscope 80 may be adjusted to coordinate the sweep of the trace on the viewing screen with the synchronization signals received in lines 90. The oscilloscope can be adjusted to depict across the face of the viewing screen the trace representing the influence of all of the needles of the knitting machine which, depending upon the gauge and diameter of the machine, may number up to several thousand needles. FIGS. 5 and 6 depict oscilloscope traces depicting the influence of all of the needles of a 30 inch circular knitting machine of 14 cut so that the influence of approximately 1400 needles is exhibited. FIG. 5 represents an oscilloscope trace from the signals of four strain gauges applied to a back-up plate 34, for a stitch cam 32 as shown in FIG. 3 arranged on a bridge circuit as shown in FIG. 4 and representative of a normal operating condition of the knitting machine.

Many specific operating abnormalities can be identified by comparison of the oscilloscope trace with the trace observed during a period of normal operation.

FIG. 6, for instance, illustrates a trace taken with the oscilloscope set exactly as during observation of FIG. 5 but showing at 110 one abnormally high pip which is the result of damage to one slot in the needle bed causing abnormally high resistance to reciprocation of one needle out of the approximately 1400 needles in the machine.

In FIGS. 7 and 8, oscilloscope traces are shown in which the oscilloscope has been adjusted to show the effect of only a small portion of the needles of the machine, i.e. approximately 15 to 20 needles. FIG. 7 illustrates the trace which occurs when the latch of one needle is broken. It is pointed out that several needles are being influenced simultaneously by the stitch cam and the succession of increasingly abnormal pips 120 which identifies this particular abnormality is believed to result from the fact that with a broken latch the needle cannot cast off previously seized loops and consequently, the pressure characteristically increases as the defective needle is drawn downwardly by the stitch cam.

FIG. 8 illustrates the trace which occurs when one needle is bent. The pipes 130 of abnormal height indicate excessive forces while the butt of the bent needle is on the stitch cam, but it should be noted that the pattern is recognizably different from that of a broken latch as shown in FIG. 7. This is believed that the array of substantially equally high pips 130 result from the fact that the increased friction due to the bent needle remains substantially uniform in its influence over the entire period of engagement of the stitch cam with the butt of the defective needle.

With the method of testing the knitting machine operation provided by this invention, the normal functioning of the knitting machine is not interferred with so that tests can be run continuously without detracting from the productivity of the machine.

Many specific abnormalities or part defects can be identified by observation of the oscilloscope trace pattern, and with proper calibration of the oscilloscope the location of the defective or abnormally operating part can be indicated within very close limits so that repair is greatly facilitated.

Another advantage of this invention is that it can frequently indicate the beginning of an abnormality so that corrective action can be taken before damage to the fabric begins.

The test apparatus of this invention may be applied temporarily and used as a step in the manufacture of new knitting machines, for instance, to check for needle bed slot abnormalities by simply observing one or two machine rotations. The best apparatus of this invention on the other hand may be applied permanently on a knitting machine and used at will to monitor the operating conditions so that full productivity of the machine can be maintained.

Having set forth the nature of this invention, what is claimed herein is:

1. Testing apparatus for a knitting machine of the type having a frame and a slotted needle bed shiftable relatively to each other, knitting needles endwise reciprocative in said needle bed slots, means associated with said knitting needles for reciprocating said needles and including butts projecting from said bed slots, said testing apparatus comprising a section block adapted to be positioned on said frame adjacent to said needle bed, angled cam means arranged on said section block for operative engagement with said needle reciprocating butts, means including a cam back-up plate with a cam engaging surface arranged on said section block for supporting said angled cam means in a selected position against the forces transmitted between said angled cam means and said needle reciprocating butts during operative engagement therebetween, said cam back-up plate being formed with a cam engaging surface disposed at an angle with respect to the direction of relative movement between said frame and said slotted needle bed, at least one strain gauge secured to said cam back-up plate for response to deflection thereof incident to transmission of said forces, and means responsive to the output of said strain guage for providing a measurable indication of the forces transmitted between said needle reciprocating butts and said angled cam means.

2. Testing apparatus as set forth in claim 1 in which means are provided for locking said angled cam means against said cam back-up plate in selected position along said cam engaging surface, and in which at least one strain gauge is secured to said cam engaging surface of said cam back-up plate and at least one strain gauge is secured to the side of said cam back-up plate which is opposite to said cam engaging surface.

* * * * *